United States Patent [19]

Banka et al.

[11] 4,088,879

[45] May 9, 1978

[54] CREDIT CARD READER AMPLIFIER

[75] Inventors: Eugene F. Banka, Livonia; Roger F. Thompson, Fenton, both of Mich.

[73] Assignee: Burroughs Corporation, Detroit, Mich.

[21] Appl. No.: 601,667

[22] Filed: Aug. 4, 1975

[51] Int. Cl.² .................. G06K 7/08; G11B 5/09; G06K 7/10
[52] U.S. Cl. .................................. 235/449; 235/466; 360/43
[58] Field of Search ............... 235/61.11 D, 61.11 E, 235/61.7 R, 61.7 B; 307/235; 360/40, 41, 42, 43; 328/110

[56] References Cited

U.S. PATENT DOCUMENTS

| | | | |
|---|---|---|---|
| 3,299,271 | 1/1967 | Stites | 307/234 |
| 3,518,648 | 6/1970 | Norris | 360/43 |
| 3,622,758 | 11/1971 | Schanne | 235/61.11 E |
| 3,711,843 | 1/1973 | Galvagni | 360/43 |
| 3,751,639 | 8/1973 | Searle | 235/61.11 E |
| 3,763,353 | 10/1973 | Nassimbene | 235/61.11 E |
| 3,806,706 | 4/1974 | Hasslinger | 235/61.11 E |

*Primary Examiner*—Robert M. Kilgore
*Attorney, Agent, or Firm*—David R. Syrowik; Ronald L. Taylor; Edwin W. Uren

[57] ABSTRACT

An amplifying device operative to sense changes in the speed of an encoded card as it is being read so as to be able to adjust the reading rate to compensateably follow said changes. The amplifying device is also able to differentially peak sense pulses read thereby disallowing noise transients.

37 Claims, 14 Drawing Figures

CREDIT CARD READER AMPLIFIER

BACKGROUND OF THE INVENTION

1. Field of the Invention

This invention relates to the field of amplifiably processing signals read from encoded credit cards and more particularly to card speed compensating circuits incorporated into credit card reader amplifiers.

2. Prior Art

Previous mechanisms having to do with credit card reader amplifiers were not able to accurately identify encoded data on a magnetic stripe on a credit card when the card was passed through a reading device at a speed greater or less than the normal speed that the amplifier was designed for. As a result, when cards were read at a non-normal speed, data pulses might either be lost entirely or confused with clock pulses also derived from the stripe thus producing an unreliable condition as to what was data.

Another problem associated with such amplifier mechanisms concerns itself with noisy transients picked up by the reader during normal operation and how to distinguish data and clock pulses from such transients.

An additional problem concerns itself with the sensing of the real start position for reading of the card's stripe. Because of repeated use or faulty manufacture, the normal begin read area on the stripe of the card may be damaged causing a delay in locking in on a clock pulse resulting in loss of data during the interval.

SUMMARY OF THE INVENTION

It is an important object of the invention to employ a speed compensation mechanism having a variable period that will proportionately compensate for speed variations of encoded cards in transit while being read thereby enabling data pulses to be accurately identified through a relatively wide spectrum of card speeds.

It is another important object of the invention to provide a peak identifier mechanism that will be able to sense a resultant differential peak as between an original signal and a delayed representation of that original signal thus allowing incoming data pulses to be accurately distinguished from noise transients.

Another further important object of the invention is to provide a mechanism for disenabling reading of the card for a first plurality of pulses to ensure that a begin read portion of the card which is highly susceptible to damage is never read thus disallowing a misread of data from that portion.

In carrying out the objects of the invention, a peak sensing network reads, amplifies and peak senses pulses derived from an encoded card. The pulses are then fed into a digitizing network that shapes and gates the pulses. Once pulses initially enter the digitizing network, a pulse delay network is enabled which disenables the digitizing network for a fixed plurality of pulses. A speed compensation network is triggered by the digitizing network to provide a signal that is compensateably proportional to the speed that the card is fed through its reader. The speed compensated signal is then gated with the digitizing network's output signal to give a true indication of a data bearing signal.

BRIEF DESCRIPTION OF THE DRAWING

Various other objects, advantages and meritorious features of the invention will become more fully apparent from the following specification, appended claims and accompanying drawing sheets.

The features of a specific embodiment of the invention are illustrated in the drawing, in which.

DESCRIPTION OF A PREFERRED EMBODIMENT

Figure 1:
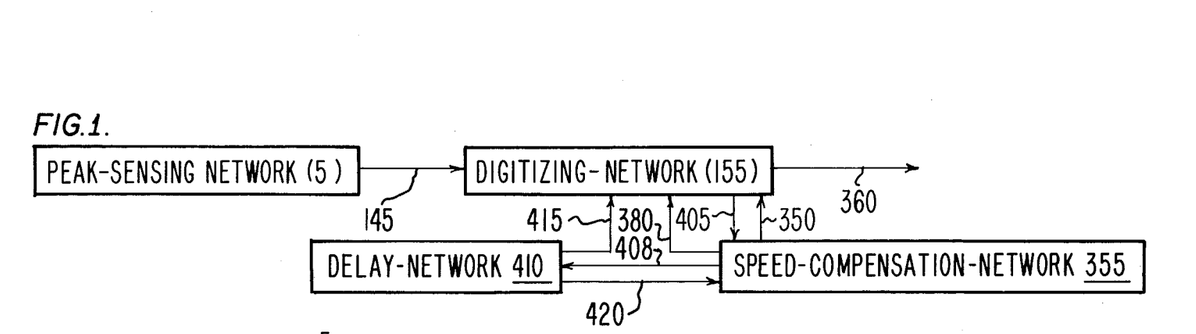
FIG. 1 is a block diagram of the credit card reader amplifier.
Figure 2:
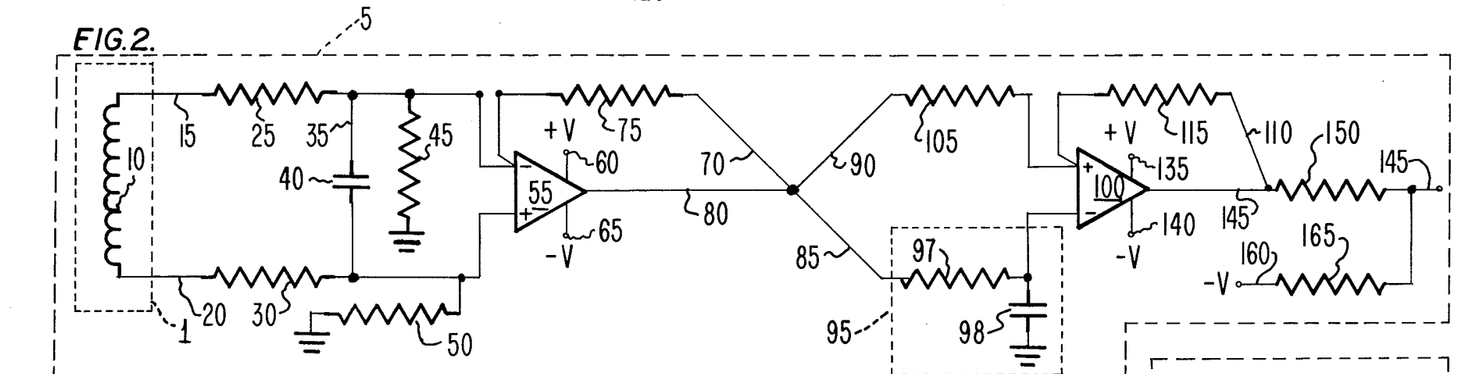
FIG. 2 is a schematic diagram of the peak sensing network of the credit card reader amplifier of FIG. 1.

Referring to FIGS. 1 through 7 by the characters of reference there is illustrated an apparatus for carrying out the objects of the invention. With reference first to a reader 1 in the peak-sensing network 5 as shown in FIGS. 1 and 2, the reader or read head 1 is comprised of a pick-up coil 10 for reading a magnetically encoded card (not shown). The signals 12 read from the card may be either clock or data pulse components with no significance attached to their polarity. It will be assumed that clock and data pulses merely alternate as shown in FIG. 6A.

Figures 6A, 6B:
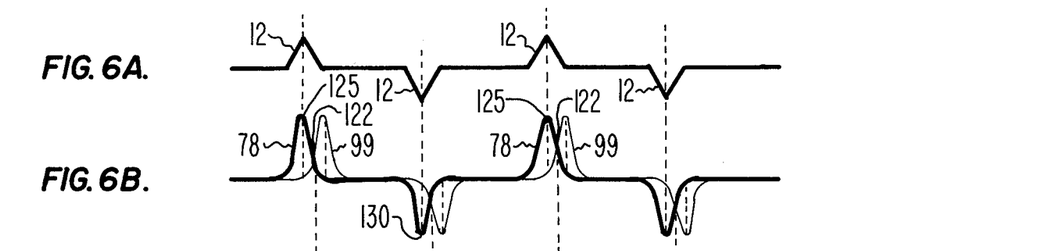
FIGS. 6A–H show timing waveforms of the pulses as read by the peak sensing network of FIG. 2, as they are processed from there to the output of the speed compensation network of Fig. 5.

Connected to the ends of the coil 10 in the peak-sensing network 5 are a pair of lines 15 and 20 each having a resistor 25 and 30 in series therewith. The resistors 25 and 30 serve as dropping resistors that will match voltage levels of the head 1 to the remainder of the peak-sensing network 5. Past the resistors 25 and 30 and on the pair of lines 15 and 20 is a connecting line 35 having a capacitor 40 for shorting out high-frequency transients. Beyond the connecting line 35 are a pair of resistors 45 and 50 each connected to one of the pair of lines 15 and 20 and set to ground on their opposite side. The purpose of these resistors 45 and 50 is to build up potential or bias for the inputs of an operational amplifier 55 downstream and to reference the bias as built up across the resistors 45 and 50 relative to ground. The operational amplifier 55, representing the first amplifying stage of the network 5, is inputted by the signals 12 on the pair of lines 15 and 20 and is a linear amplifier whose maximum output amplitude is set by positive and negative voltage supplies 60 and 65, respectively. Feeding back from the output of the operational amplifier 55 to the inverting or negative input of the operational amplifier 55 is a line 70 having a resistor 75 in series therewith that sets the gain for the amplifier 55 which, in this embodiment, is a voltage gain of approximately 108. As such, the output on line 80 of the amplifier 55 as shown at 78 in FIG. 6B is an amplified version of what was inputted to it without appreciable distortion.

To achieve what is here called peak sensing, the output signal 78 on line 80 from the operational amplifier 55 is branched off to two lines 85 and 90. The first line 85 contains a grounded RC network 95 having a resistor 97 and a capacitor 98 that introduces a short delay to the signal 78 thus creating a signal 99 as shown in FIG. 6B which is then inputted to the negative inverting side of an operational amplifier 100. The second line 90 is introduced without delay to the operational amplifier 100.

The threshold level, above which a flux-reversal in the amplifier 100 is acted on, as will be explained infra, is achieved by placing a resistance 105 in series with the non-delay line 90. It is then fed back on a line 110 from the output of the amplifier 100. A second threshold resistor 115 that is serially connected to the line 110 is attached at one end to both the positive non-inverting input and the other threshold resistor 105. This threshold resistor 115 which is set in the positive feedback loop 110 for the operational amplifier 100 controls by its value of resistance the voltage gain of the amplifier 100 which is here set to approximately 2,000. Because the operational amplifier 100 functions also as a differential amplifier, the delayed signal 99 on line 85 will be subtracted from the undelayed signal 78 on line 90 such that the intersection 122 of the two signals will occur just after the peak 125 of the undelayed signal 78. This represents a flux reversal point at which the operational amplifier 100 will positively saturate or negatively saturate depending on whether it is just after the 90° (125) input peak or the 270° (130) input peak respectively as shown in FIG. 6B. As mentioned infra, the pair of resistors 105 and 115 fix the threshold level, only above which a flux reversal will change the state of the amplifier 100. One of the purposes of the threshold level is to block out various spurious transients (not shown) that may be inputted to the amplifier 100 so they will not accidentally trip it to an on state. The actual output of this amplifier 100 is a transition acting to form a square wave corresponding to those flux reversals by the amplifier 100 and bounded by its positive and negative voltage supplies 135 and 140 as shown at 142 in FIG. 6C. The amplifier output on line 145 is connected in series to a dropping resistor 150 which lowers the level of the peak-sensing network 5 voltage to that of the digitizing network 155. A negative bias 160 is supplied for the line 145 through another dropping resistor 165. The creating of the square wave 142 by the networks from the read signals 12 serves as a preparatory step for the digitizing of network 155.

Figure 3:
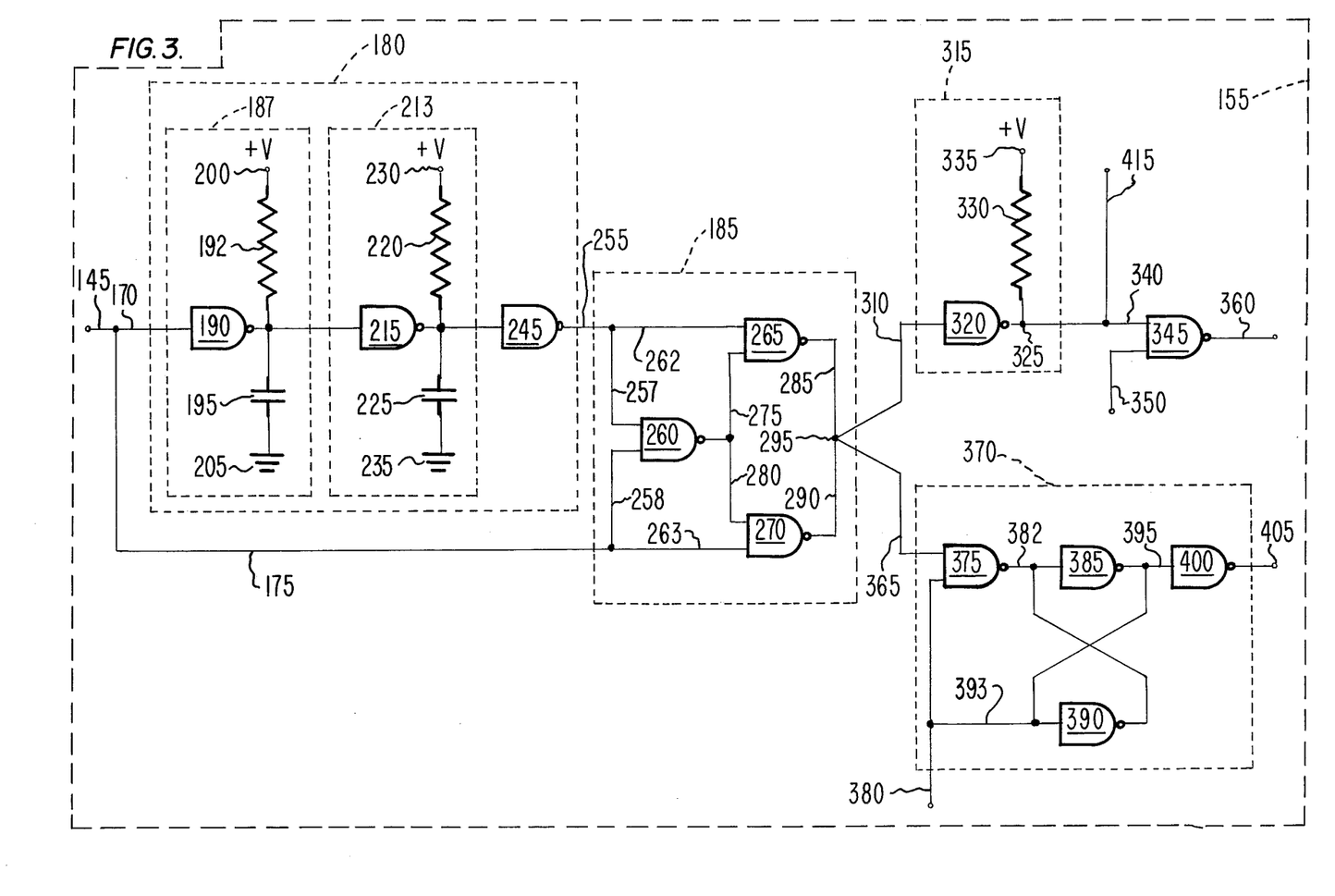
FIG. 3 is a schematic diagram of the digitizing network of the credit card reader amplifier of FIG. 1.
Figure 6C:
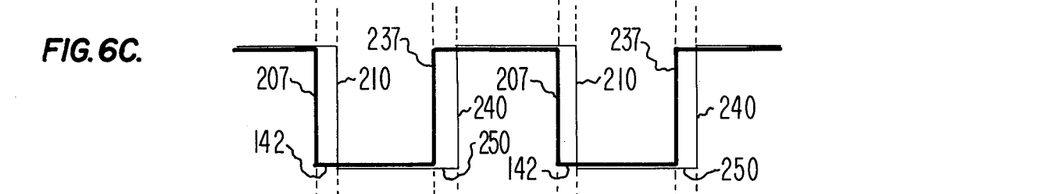

The line 145 from the peak-sensing network 5 going into the digitizing network 155, as shown in FIG. 3, is bifurcated into lines 170 and 175 with one side 170 going to an edge delaying network 180 and then in turn to an exclusive OR gate 185. The other side on line 175 proceeds without interruption to the exclusive OR gate 185. The edge delaying network 180 begins with a trailing edge delay circuit 187 comprising in series a driving gate 190, and a RC network having a resistor 192 and a capacitor 195 that is positive biased at the resistive end by a supply voltage 200 and grounded 205 at its capacitive end. This acts to cause the original trailing edge 207 of the amplifier's 100 square wave 142 to be slightly delayed as shown in FIG. 6C at 210 by an amount determined by the RC time constant for resistor 192 and capacitor 195. Next, in series in the edge delaying network 180 is a leading edge delay circuit 213 comprising in series a driving gate 215 and a RC network having resistor 220 and capacitor 225 that is also positive biased by a supply voltage 230 at the resistive end and grounded 235 at the capacitive end. This will cause the original leading edge 237 square wave 142 to be slightly delayed as shown in FIG. 6C at 240 by an amount determined by the RC time constant of resistor 220 and capacitor 225 which will be the same as the trailing edge RC 187 time constant. A final driving gate 245 follows in series with the leading edge delay circuit 213 to amplify and output on line 255 the delayed square wave signal 250 as shown in FIG. 6C to a degree necessary to be sensed by the following exclusive OR gate 185.

Figure 6D:
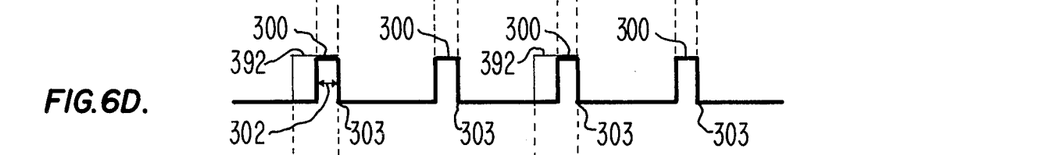

The exclusive OR circuit 185 in the digitizing network 155 has inputted to it the delayed square wave signal 250 on line 255 from the edge delaying circuit 180 and the square wave non-delay signal 142 again as shown in FIG. 6C on line 175. The signals from each line 255 and 175 being bifurcatably inputted first on lines 257 and 258, respectively, to a common NAND gate 260 and then on lines 262 and 263, respectively, to their own separate NAND gates 265 and 270. The output signal from the common NAND gate 260 is bifurcated and inputted on lines 275 and 280 to the separate NAND gates 265 and 270. The output on lines 285 and 290 from these separate NAND gates 265 and 270 are then gated to a common terminal 295 that serves as the output terminal for the exclusive OR circuit 185. The exclusive OR gate 185, as is well known, will act on only the concurrent receipt of one active input at a time and where there is more than one or no active inputs, none will be acted on by the exclusive OR gate 185. The effect of the exclusive OR gate 185 in the present case is to output signals 300 as shown in FIG. 6D in a manner that is analogous to having the delayed signal 250 subtracted from the undelayed signal 142 leaving only the non-coincident areas of the two signals 142 and 250 with the bandwidth and time position of the difference being equal to the new signal 300. Thus each of the new digitized pulses 300 created will have a relatively short bandwidth 302 equal to the induced delay and with starting point 303 being equal to the delayed signals 250 leading 240 or trailing edge 210 respectively. It will be also noted that as of the output of the exclusive OR circuit 185, we have lost polarity sense, that is, all pulses outputted are positive. Branching off on line 310 from the exclusive OR 185 output terminal 295 is a line that inputs to a buffer circuit 315 for adjusting bias and gain whose first component is a driving gate 320. The driving gate 320 output intersects at a terminal 325 common to one end of a dropping resistor 330 which has positive bias from a supply voltage 335 applied at its other resistive end. This intersecting terminal 325 serves as an outlet on line 340 for all pulses from the digitizing network 155 which will be later gated at a NAND gate 345 with the line 350 (FIG. 1) containing the output from a speed compensation circuit 355 to determine whether the pulse at the intersection terminal 325 is true data and accordingly output a pulse on line 360 if it is, as will be explained further infra.

Also branching off from the exclusive OR circuit 185 is a line 365 that inputs into a latching circuit 370. The latch circuit is engaged or enabled only when signals 300 on line 365 are clock signals as will be seen infra. When a signal from the OR gate 185 is inputted to a NAND driving gate 375 it will in turn, assuming no data anticipation signal from the speed compensation network 355 is present at its other input on line 380, proceed to output on line 382 to a pair of cross-connecting latching NAND gates 385 and 390. As is well known in the art, the pair of latching gates 385 and 390 are connected by linking the output of one to the input of the other. Thus when an enabling or clock signal 300 on line 382 is applied to the input of gate 385, that gate 385 will continue to output even after the enabling input 300 is removed as shown at 392 in FIG. 6D. To disenable the pair of latching gates 385 and 390, so as to prevent them from outputting once the speed compensation network 355 begins outputting, a disengaging input on line 380 from the speed compensation network 355 must be applied through line 393 to the other gate 390 of the pair of latching gates 385 and 390 which will cause the first mentioned gate 385 of the pair to cease outputting. As will be seen later, the purpose of creating the lagged output signal 392 on line 395 from the latching circuit 370 as amplified through gate 400 on line 405, shown in FIG. 6D, is to give a start-up input signal to the speed compensation network 355 that is of sufficient duration to always fire it.

Figure 4:
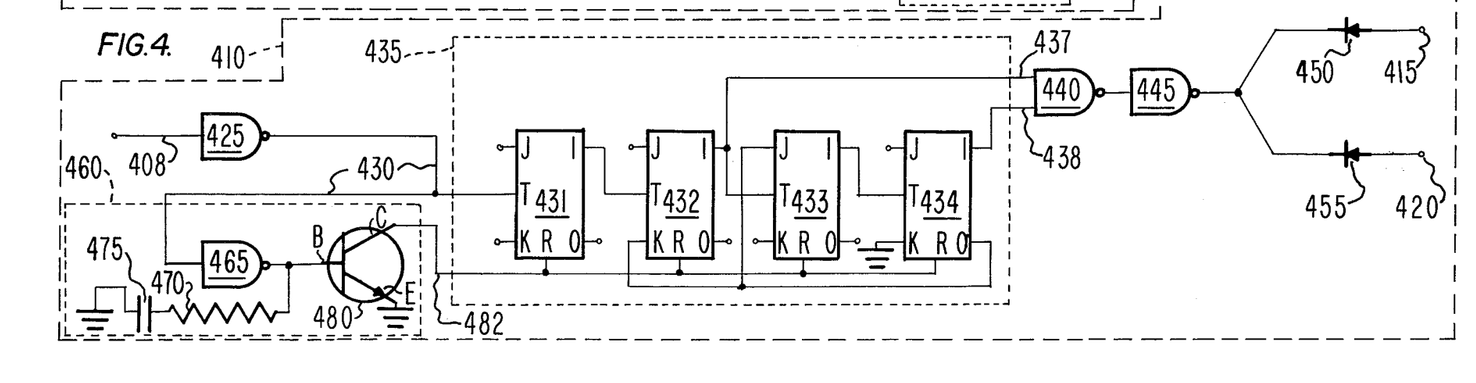
FIG. 4 is a schematic diagram of the delay network of the credit card reader amplifier of FIG. 1.

Receiving a signal from the speed compensation network 355 on a line 408 which branches off from line 380, is a delay network 410, as shown in FIG. 4. The delay network 410 acts through line 415 and 420 to inhibit the outputting of signals on line 340 and 350 for the digitizing network 155 and the speed compensation network 355 respectively for a fixed first plurality of pulses as read from the card. The purpose of the network 410 being to disenable reading of the card particularly at the beginning of the magnetic stripe which is highly susceptible to edge damage due to card abuse and faulty manufacture. The delay network 410 is comprised of the line 408 emulating from the speed compensation circuit 355 which is linked in turn through a driving NAND gate 425 and out on line 430 to the trigger T of a flip flop 431. Flip flop 431 is in turn linked in series to three other flip flops 432, 433, 434 to provide a ten pulse binary counter 435 as is well known in the art, all flip flops being of the standard J-K type. The second and fourth flip flops 432 and 434 highside 1 outputs on lines 437 and 438 respectively are gated to a NAND gate 440 to provide a holding pulse once count ten is reached. This count ten pulse is in turn relayed through a second gate 445 to a pair of normally forward biased diodes 450 and 455 and out on lines 415 and 420 that intersect the digitizing network 155 and speed compensation network 355 output on lines 340 and 350, respectively. Once the second gate 445 changes state upon a ten count, the diodes 450 and 455 will be reversed biased thereby removing the blocking bias of the gate 445 and thus enabling the digitizing network 155 and speed compensation network 355 to freely output. It will be noted that the counter circuit 435 is reset initially by a circuit 460 that is inputted to from the speed compensation network 355 on the line 430. The reset circuit 460 consists of a driving gate 465, a RC circuit having a resistor 470 and a grounded capacitor 475 and a transistor 480 in series. The capacitor 475 of the RC circuit of 470 and 475 will charge up to its full capacity during a relatively long period of no reading and thus turn the transistor 480 on which will supply a continuing signal on line 482 to the resets R of flip flops 431-434 enabling them to output only at their low levels O. Once a pulse is transmitted on line 408 through gates 425 and 465, the capacitor 475 will be discharged thereby removing the flip flop reset signal on line 482. The initial pulse and all further pulses on line 408 will be carried through gate 425 and line 430 to the trigger T of flip flop 431 to initiate counting of circuit 435. If the pulses are regular in their rate as would be data, the capacitor 470 will never have time to charge up to reset circuit 435. This will enable counter circuit 435 to count up to ten after receipt of as many pulses on line 408. At count ten, the circuit 435 will latch itself by the low output O of flip flop 434 being fed back to the low K and high J inputs of flip flop 432 and 433 respectively thereby disallowing any further resetting by circuit 460.

In the actual configuration of the counter 435 of delay network 410, the flip flop 431 trigger terminal T is connected, as mentioned supra, to gate 425. Flip flop 431 has its input J and K terminals open-circuited as is the output O terminal. The output 1 terminal of flip flop 431 is connected to the trigger terminal T of flip flop 432. The input J terminal of flip flop 432 is open-circuited as is the output O terminal. The input K terminal of flip flop 432 is linked to the output O terminal of flip flop 434 as will be seen infra. The output 1 terminal of flip flop 432 is connected to the trigger terminal T of flip flop 433. The output 1 terminal of flip flop 432 also is linked to the input of gate 440 as mentioned supra. The input K terminal and the output O terminal of flip flop 433 are open-circuited. The input J terminal of flip flop 433 is connected to the output O terminal of flip flop 434 as will be seen infra. The output 1 terminal of flip flop 433 is connected to the trigger T of flip flop 434. The input J terminal of flip flop 434 is open-circuited. The input K terminal of flip flop 434 is grounded. The output 1 terminal of flip flop 434 goes to the input of NAND gate 440 on line 438 as mentioned supra. The reset terminals R for all four flip flops are connected in common to the output of transistor 480 as mentioned supra. The output O terminal of flip flop 434, as already mentioned, is linked back in common to the input J and K terminals of flip flops 433 and 432 respectively.

Figure 5:
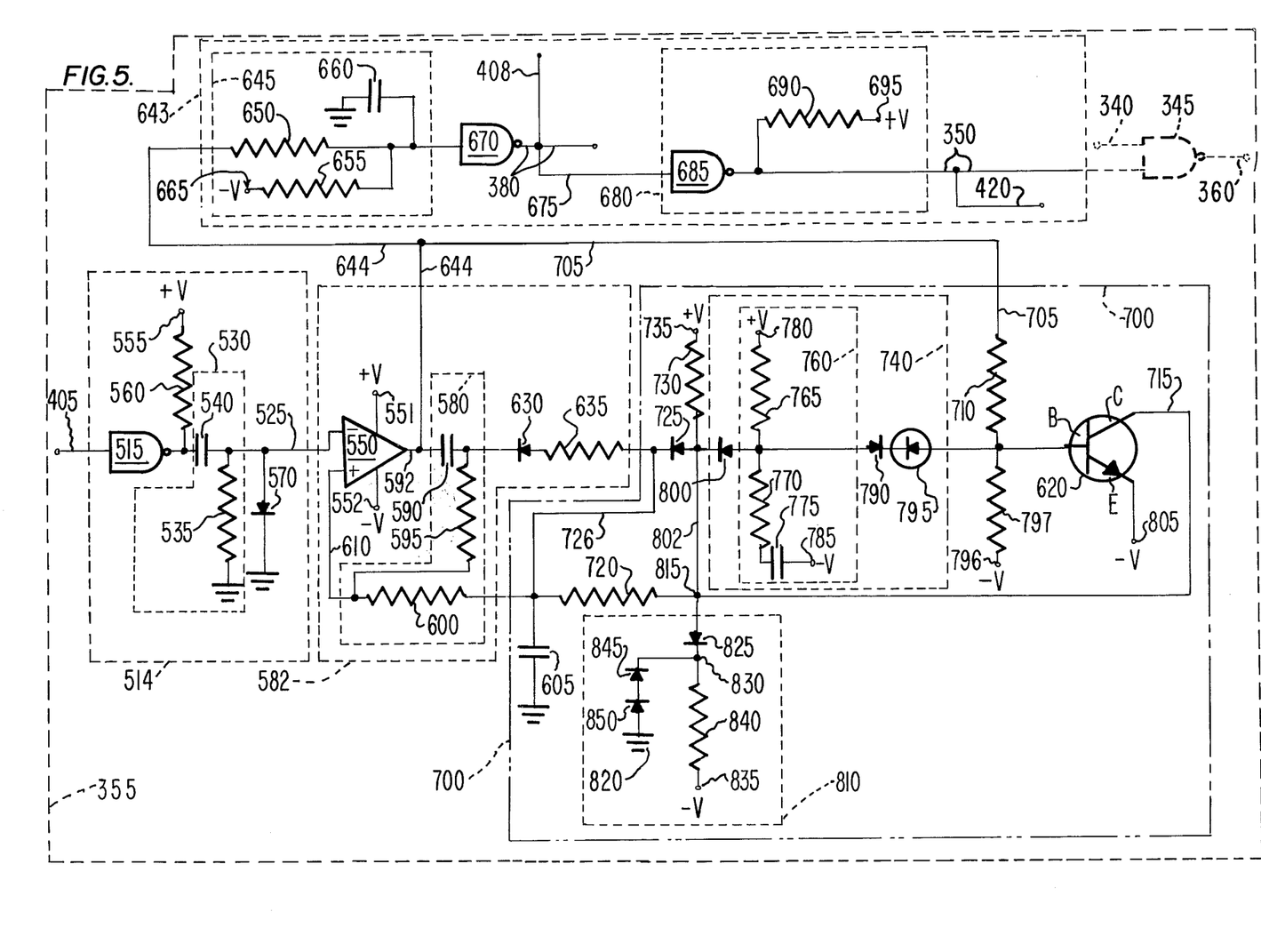
FIG. 5 is a schematic diagram of the speed compensation network of the credit card reader amplifier of FIG. 1.
Figure 6E:
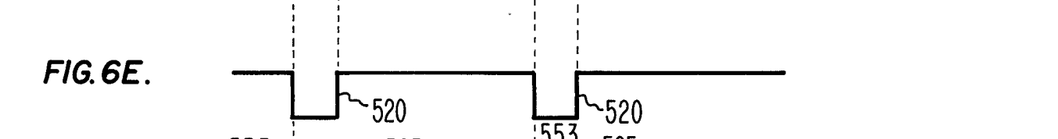
Figures 6F, 6G:
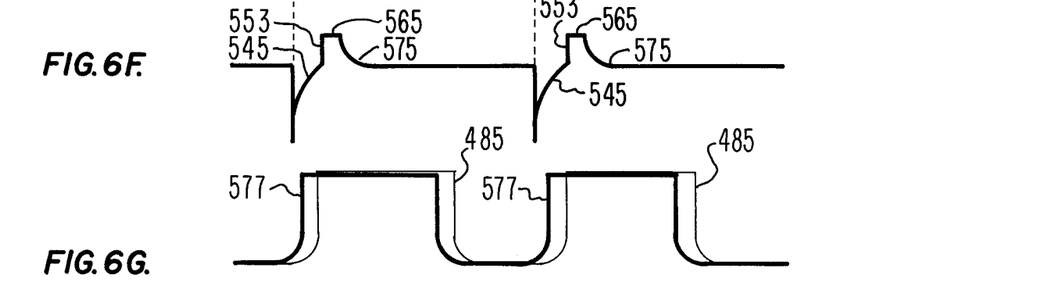
Figure 7:
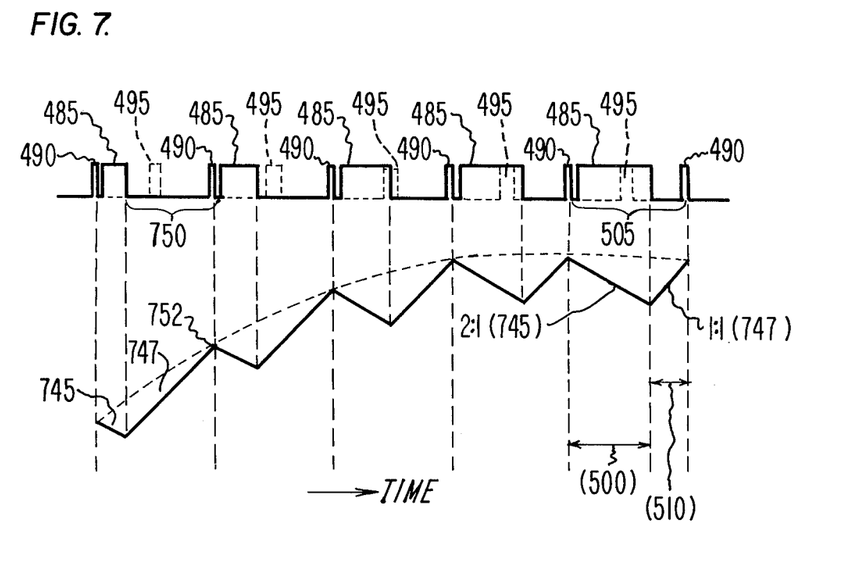
FIG. 7 shows a timing diagram for a reference capacitor voltage and a dependent signal output of the speed compensation network of FIG. 5, as the output signal normalizes itself through time to a new card speed.

A signal 392 is carried on line 405, as shown in FIG. 6D, from the latch circuit 370 of the digitizing network 155 and is inputted to the speed compensation network 355. This causes the network 355, as shown in FIG. 5, to output a signal hereinafter a SC pulse 485 on line 350, as shown in FIGS. 6G and 7. The SC pulse 485 is proportionately related to the speed of the card being fed through the reader 1. More precisely, the magnetically encoded stripe area on the card has recorded thereon the aforementioned clock pulse 490 at equidistant spatial increments with data bit pulses 495 recorded or not recorded midway therebetween representing 1 or O data bits, respectively, as representatively shown in FIG. 7. The speed compensation network 355 creates the supra mentioned SC pulse 485 that begins after the clock pulse 490 and ends at a point that is equal to the fixed ratio of ⅔ of the clock pulse 490 period. The ⅔ point, when reached, represents a normalization by the speed compensation network 355 to the cards new speed as shown at 500 in FIG. 7. It will be noted, as will be explained infra, the start of the SC pulse 485 is delayed in time from the start of the latch signal 392. The SC pulse 485 on line 350 when NAND gated at 345 to the line 340 carrying both clock 490 and data pulses 495 emulating from the digitizing network 155 gives an accurate means of distinguishing between clock 490 and data pulses 495. The reason for this being that the SC pulse 485 acting as a predetermined time frame is mutually exclusive in the time domain as to clock pulses 490 but has a high probability of being intersective or concurrent in the time domain as to data pulses 495. The particular rationale for using ⅔ rather than 3/3 of the clock period 505 as the SC period 500 is that if past ⅔ the clock period a data pulse 495 has not yet been detected, then the card is being moved past the reader 1 either very slowly or there was no data pulse 495. The latter is assumed since otherwise there would be a high probability of erroneously detecting and interpreting a clock pulse 490 as a data pulse 495 during the final ⅓ (510) division of the clock period 505 with no means of distinguishing between the two. On the other hand, if the card is moved through the reader 1 even very fast, there is always an electronic time separation between the clock 490 and the beginning of the SC pulse 485 for reasons detailed infra thus enabling distinguishment between clock 490 and data 495 even at very high speeds unlike the end detection mode mentioned supra. As will be detailed infra, where card speed is abnormal, the speed compensation network 355 will not be able to instantaneously create a normalized SC pulse proportional to the new speed 495 that is ⅔ (500) the clock period 505 due to the inherent inertia that is built into the mechanism as will be seen, but rather may take up to ten clock periods 505 to adjustably create the correct SC pulse 485.

In the actual circuit of the speed compensation network 355 a driving NAND gate 515 of an input circuit 514 receives a positive pulse 392 on line 405 as shown in FIG. 6D from the latching circuit 370 which, as indicated supra, will continue to be applied to the gate 515 until the speed compensation network 355 turns completely on. Once the network 355 is on, it will in turn switch off the latching circuit 370 as will be shown infra. The driving NAND gate 515 functioning as an inverter will reverse the polarity of the incoming latching signal 392 so as to output a negative pulse 520 on line 525 as shown in FIG. 6E. The negative pulse 520 is then inputted to a grounded RC circuit 530 having a resistor 535 and a capacitor 540 which shapes it to a spike 545, as shown in FIG. 6F, so as to be able to trigger a downstream operational amplifier 550 having positive 551 and negative 552 voltage supplies. Once the RC spike 545 is inputted to the operational amplifier 550, the discharge of the spike 545 will cause the capacitor 540 to over charge 553 into the positive region towards a positive supply voltage 555 as indicated across a dropping resistor 560. This positive overcharge 553 will be clamped off at 565 just above ground by a grounded diode 570 which serves as a quick discharge path to ground out all positive voltage above that level. As such, once the pulse 545 is clamped off, it will drop again to a point very near ground 575 thus enabling the RC circuit 530 to be retriggered again quickly.

Once the operational amplifier 550 of the speed compensation network 355 is put into saturation by the negative spike pulse 545 at its negative input, which is lower than its near ground positive input, it will output a square wave 577, as shown in FIG. 6G which is the related undelayed version of the outputted SC pulse 485 as will be explained infra. The period of the square wave 577 output being dependent upon the relative time constant of a RC circuit 580 in the feedback loop of the operational amplifier 500. The RC circuit 580 and amplifier 550 act together to form a monostable multivibrator analog 582 having a variable period as will be seen infra. The RC circuit 580 consists of a capacitor 590 in series with the output of the amplifier 550 on line 592, a resistor 595 in series with the capacitor 590 and a voltage divider resistor 600 in series with the previously mentioned resistor 595 but branching off to ground through another capacitor 605 will be detailed infra. At the common terminal of the resistors 595 and 600 in the RC circuit 580 another line 610 branches off to the positive non-inverting input of the amplifier 550 to provide positive feedback. As is well known in the art, the RC circuit 580 in the feedback loop sets the reference level at the positive input of the amplifier 550 which while below the negative inverting input level will cause negative saturation and when above that level will cause positive saturation.

Figure 6H:
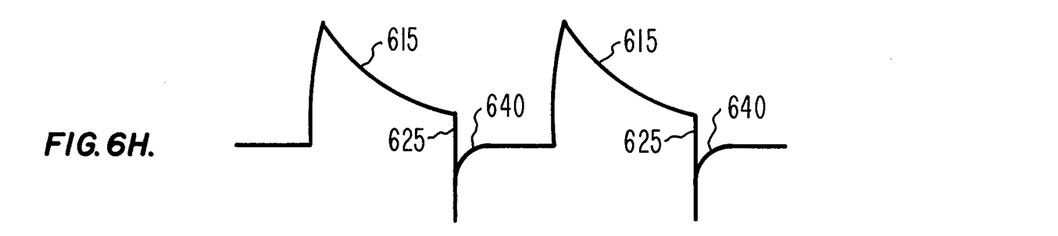

After the amplifier 550 begins outputting square wave 577, the capacitor 590 will begin to discharge with a time constant of the resistive sum of resistor 595 and 600 times the capacitance of 590 as shown at 615 in FIG. 6H. By virtue of the voltage dividing by resistor 595 and resistor 600, half of the voltage will be fed back into the plus terminal of the operational amplifier 550. Once the voltage fed by the RC circuit 580 to the positive non-inverting input 550 reaches the end of its discharge cycle and begins to rise back above the negative input level, the amplifier 550 will negatively saturate and in turn switch off a high gain drive transistor 620 which was discharging the reference capacitor 605 very negative as will be detailed infra. This has the effect of impressing a very negative voltage across the capacitor 590 almost instantaneously, as shown at 625, from the grounded reference capacitor 605 via the resistor 600. An additional feature of circuit 582 will allow the capacitor 590 to begin to immediately release its impressed negative voltage through a now forward biased diode 630, its associated resistor 635 and the now charging grounded reference capacitor 605. This has the effect of providing a fast recovery path for the capacitor 590 where the charging period is resistor 635 times capacitor 590. Thus the charging period back to ground is significantly reduced as shown at 640, by the short circuiting effect of the now forward biased diode 630 and allowing the operational amplifier 550 to be retriggered again at a much earlier point in time.

The square wave output signal 577 of the operational amplifier 550 is sent to an output circuit 643 in the network 355 via line 644 which includes a RC circuit 645 having resistors 650 and 655, and capacitor 660. The RC circuit 645 is biased through the resistor 655 by a negative voltage supply 665. The RC circuit 645 introduces a delay in unlatching the latch circuit 370 by shifting the square wave signal 577 through time to become the already supra mentioned SC pulse 485 so as to give the operational amplifier 550 sufficient time to turn full on so as to avoid astable oscillating if insufficient trigger pulsing has been received by the amplifier 550. The SC pulse signal 485 proceeds to a driving NAND gate 670 where at the output thereof, the output line 380 leads to the gate 375 to disenable it from further outputting and also through line 393 to unlatch the latch circuit 370, as already mentioned supra. Branching off from line 380 is the already mentioned line 408 which is input for the delay network 410 mentioned infra. Also branching off from line 380 is line 675 which proceeds to a buffer circuit 680 for adjusting bias. The buffer circuit 680 comprises a driving NAND gate 685 whose output line 350 is intersected by a dropping resistor 690 having a biasing positive voltage supply 695 attached thereto. Also intersecting line 350 is the aforementioned pulse blocking line 420 from the delay network. The output of the gate 685 on line 350 is in turn gated to the already mentioned NAND gate 345 of the digitizing circuit 155 that also receives an input from the NAND gate 320 on line 340 carrying data and clock pulses outputting therefrom. A true condition for the gate 345 enabling an output on line 360 is a concurrence of a data pulse or lack thereof and a validating SC pulse 485 as detailed supra.

To adjust the period of the SC pulse 485 to reflect a speed change, a circuit 700 is placed in the speed compensation network 355. In the adjustment circuit 700, a line 705 branches off from the output line 644 of the operational amplifier 550 and proceeds through a dropping resistor 710 to the base B of the drive transistor 620. When the operational amplifier 550 outputs through the above line 705 to the transistor 620, the transistor 620 is turned on to output a signal on line 715 through its collector C and then through a dropping resistor 720 to the aforementioned grounded reference capacitor 605. The effect of the turned on transistor 620 is to discharge the reference capacitor 605 driving it negative until the operational amplifier 550 times out and turns off which in turn turns off the associated transistor 620. Once the transistor 620 turns off, the reference capacitor 605 will begin to charge positive through a diode 725 via connecting line 726 that is now forward biased because of the removing of the reverse bias of the transistor 620 output. The actual positive charging potential for the reference capacitor 605 is supplied through the diode 725, by the dropping resistor 730 which derives its potential from a positive power supply 735.

The adjusting circuit's 700 operation may be demonstrated by the extreme example of where the speed of a card being fed through the reader 1 is abnormally slow and it is the beginning of a card read. A biasing circuit 740 of the adjustable circuit 700, as will be explained infra, by biasing the reference capacitor 605 very negative will constrict or variably bias the operational amplifier's 550 RC circuit 580 to store a very low energy or negative voltage potential level that is proportional to the time that said transistor 620 discharged said reference capacitor 605. That is, the time that it takes for RC circuit 580 to decay to a level where it will bias the positive non-inverting input of the amplifier 550 to a level above the negative inverting input will be very short since the respective bias levels of the inverting and non-inverting inputs will be very close. The reason being that from the relatively low potential that the reference capacitor 605 biases the RC circuit 580, very little time will be needed to decay the RC circuit 580 built up potential to a point where the feedback voltage on line 610 will cause the operational amplifier 550 to negatively saturate. Thus if the RC 580 period is very short and the capacitor 605 discharging and charging slope ratios are 2:1 (745) and 1:1 (747) respectively, as shown in FIG. 7, then the period of signal 577 and likewise its delayed version SC pulse 485, in the discharge mode, will be less than the normal ⅔ (500) of clock period 505. As such, some adjustment of the SC pulse 485 period will be required. This is obtained by the reference capacitor 605 being charged in a positive direction, while the operational amplifier 550 is off, at the 1:1 (747) ratio. Since the non-SC pulse period 750 is longer than normally alotted, for the first several clock periods, that is greater than ⅓ (510) the clock period 505, the reference capacitor 605 voltage potential level 752 at the end of the non-SC pulse period 750 will be higher than it was at the beginning of the SC pulse 485 period. As explained supra, the higher the reference capacitor 605 voltage level, the longer the relative RC 580 period of the operational amplifier 550 since each new starting will be made at a relatively higher energy or voltage level. As such, the process may be reiterated for up to ten clock periods for the above-mentioned extreme case until the SC pulse 485 period is ⅔ (500) of the clock period 505. Once this is achieved and assuming the speed remains constant, what the capacitor 605 incrementally loses by discharging will be recovered by what is incrementally gained by charging due to the reference capacitor's 605 different, but balanced discharge and charging levels. If the card speed again changes, the adjustment circuit 700 will again change the SC pulse 485 period over a plurality of clock pulses 505, as shown in FIG. 7, to match the new speed, that is, to be ⅔ (500) of the clock period 505. As such, the SC pulse 485 period may be considered to be a fairly stable window during which any pulse picked up by the reader 1 concurrent in time with the SC pulse 485 window, can be considered with some certainty to be a true data pulse 495 and not a clock pulse 490.

When a period has elapsed which in real time is analogously equivalent to approximately ten clock periods whereupon the operational amplifier 550 has been in a quiescent state has not outputted a pulse 577 and in turn the SC pulse 485, the biasing circuit 740 of the adjusting circuit 700 will turn on the drive transistor 620. The transistor will then stay on until the next output pulse from the operational amplifier 550 resets it off. This has the effect of driving the reference capacitor 605 relatively very negative which in turn sets the reference level very low from which the feedback RC circuit 580 discharges from thus providing a relatively very short time base for the next square wave 577 outputted. The purpose of this is to provide an anticipation of a potentially very short next clock period 505 thus disallowing any square wave 577 greater than the subsequent clock period 505. Again, the square wave 577 and in turn the SC pulse 485 will adjust out in time over a plurality of clocks 505 to be equal to ⅔ (500) of clock period 505.

The biasing circuit 740 structurally comprises a RC circuit 760 having a resistor 765, a resistor 770 and a capacitor 775 all in series relative to each other. Additionally, a positive power supply 780 is connected to the non-common end of the resistor 765 and a negative power supply 785 connected to the non-common end of the capacitor 775. Also in the biasing circuit 740 is a back to back diode-zener diode 790 and 795 combination in series linked at one end to the common terminal of the resistors 765 and 770 and at the other end to the base (B) input of transistor 620. The base (B) is biased by a negative voltage supply 796 through a dropping resistor 797. In operation, the RC circuit 760 is reset by every square wave signal 577 from the operational amplifier 550 over line 705, through dropping resistor 710, turning on transistor 620 through line 715 and 802 to forward bias a diode 800. The diode 800 will then allow current to flow from the partially charged capacitor 775 to the dropping resistor 720 on connecting line 802, to the collector C of saturated (ON) transistor 620 to discharge the RC circuit 760. After being reset to the negative supply 805 level by the square wave 577, the RC circuit 760 will begin again to charge up towards the positive voltage supply 780 level. If after the real time span equivalent of ten clock periods 505, the charging RC circuit 760 has not been reset, it will have charged enough to forward bias the diode-zener combination 790 and 795. This will act to present the positive potential of the RC circuit 760 to the base B of the transistor 620 which will turn it on and leave it on until the RC circuit 760 is again reset by the operational amplifier 550 turning on. As the zener diode 795 will be regulated by its companion diode 790 not to turn fully on, the transistor 620 also will not turn fully on thus limiting its output voltage at its collector C to a level substantially less than a negative power supply 805 which is presented to the emitter E. This limiting of the transistor 620 output also limits the level of the reference capacitor 605 discharging to a value more positive than the negative voltage supply 805. This is important in that if the potential on the reference capacitor 605 is too negative it will present the reference positive non-inverting input of the operational amplifier 550, with such a negative bias that pulses arriving at the negative inverting input will never be able to be relatively more negative than the reference positive input. As such, pulses at the input will never be able to turn the amplifier 550 back on. With this limitation the level of negative voltage presented to the non-inverting input, a pulse at the inverting input will always be sufficient to turn on the amplifier 550.

After the operational amplifier 550 times-out thus turning off the associated drive transistor 620, the reference capacitor 605 will begin to charge positive as mentioned infra. If the negatively charged reference capacitor 605 is relatively positive to start with and a new clock 490 does not occur after five clocks but less than ten clocks in equivalent real time, than the biasing circuit 740 will not come on in time to disallow the reference capacitor 605 from approaching ground potential. This would have the effect of in turn presenting through the voltage divider resistor 600 to the positive non-inverting input of the operational amplifier 550 a potential near ground similar to that presented to the negative inverting input of the same amplifier 550. As such, if this would be allowed to happen, the amplifier 550 would uncontrollably astably oscillate since the differential between potentials presented to the pair of inputs to the amplifier 550 would be nearly indistinguishable. To solve this problem, a circuit 810 in the adjustment circuit 700 analogous to a power supply or charging potential clamp has been connected with one end to terminal 815 and the other end to ground 820. As such, the circuit 810 having a series of biased diodes acts to effectively clamp the reference capacitor s 605 potential to a maximum positive potential of just slightly below ground.

In the actual operation of the circuit 810, when the positive supply potential 735 attempts to cause the reference capacitor 605 to closely approach or even exceed the ground potential, then a diode 825 connected at one end to terminal 815, will become forward biased allowing the surplusage positive potential to flow to a terminal 830. A negative power supply 835 provides potential through a dropping resistor 840 to the terminal 830. This disallows the voltage at 830 from exceeding ground potential since diodes 845 and 850 remain in a conductive state and maintain a fixed voltage below ground potential.

From the foregoing description of a specific mechanism illustrating the fundamental features of the invention, it will now be apparent to those skilled in the art that the invention may be constructed in a variety of forms without departing from the true spirit and scope thereof. Accordingly, it is to be understood that the illustrated mechanism disclosed herein is a preferred embodiment of the invention and that the invention is not to be limited thereby, but only by the appended claims.

What is claimed is:

1. An amplifier system operative to receive a signal from an encoded card reader for differentiably obtaining data clock components from the read signal over a broad band of signal speeds, comprising:
   a. means for delaying the signal from the reader and for producing a square wave signal whose transitions correspond to the intersections of the delayed and undelayed signals from the reader;
   b. means for delaying the signal from said squaring means and for gating the delayed and undelayed signals from said squaring means to obtain, upon the non-concurrent receipt of either, a digital signal;
   c. means initiated by the clock component of the digital signal from said digitizing means for producing a signal whose period is compensated by the speed of the digital signal to be proportional to a predetermined time frame in which probabilistically the data component of the digital signal may occur wherein said signal rate compensation means includes an adjustment circuit means for adjusting the period of the compensated signal over a plurality of clock periods; and
   d. gating means responsive to the concurrent receipt of signals from said speed compensation means and said digitizing means for producing a signal indicative that the digital signal from said digitizing means is a data component.

2. The amplifier system of claim 1 wherein said squaring means further includes means for separately amplifying the read signal and the square wave signal.

3. The amplifier system of claim 2 wherein said amplifying means is an operational amplifier.

4. The amplifier system of claim 1 wherein said means for delaying the read signal is a resistive-capacitive circuit.

5. The amplifier system of claim 1 wherein said squaring means is an operational amplifier having a resistive feedback loop which will saturate and output the transition of the square wave when the inputted delayed and undelayed read signals intersect above a threshold level as set by the resistance in the feedback loop.

6. The amplifier system of claim 1 wherein said means for delaying the square wave signal comprises trailing edge delay resistive-capacitive circuit means and leading edge delay resistive-capacitive circuit means for delaying the trailing edge and the leading edge respectively of the square wave of said squaring means.

7. The amplifier system of claim 1 wherein said digitizing means includes an exclusive OR gate.

8. The amplifier system of claim 7 wherein said exclusive OR gate is a plurality of NAND gates.

9. The amplifier system of claim 1 wherein said digitizing means further includes a latch circuit means for engaging the digital signal of said digitizing means to continue being used to trigger on said speed compensation means until a disengaging signal is received from said speed compensation means.

10. The amplifier system of claim 9 wherein said latch circuit means is a pair of cross-connected NAND gates operative to latch on upon receipt of an enabling input to a first of said pair of gates and to latch off when an disenabling input is applied to the other gate.

11. The amplifier system of claim 9 wherein said speed compensation means further includes resistive-capacitive delay circuit means responsive to delay sending the disenabling signal from said speed compensation means to said latch means until sufficient time has elapsed to allow said speed compensation means to fully turn on.

12. The amplifier system of claim 1 further comprises counter means responsive to be incremented by signals from said speed compensation means for outputting after a given plurality of increments an unblocking signal for allowing signals from said speed compensation means and said digitizing means to be received thereafter by said gating means.

13. The amplifier system of claim 12 wherein said counter means further comprises means responsive to a first signal from said speed compensation means to reset said counter means.

14. An amplifier system operative to receive a signal from an encoded card reader for differentiably obtaining data clock components from the read signal over a broad band of signal speeds, comprising:
  a. means for delaying the signal from the reader and for producing a square wave signal whose transitions correspond to the intersections of the delayed and undelayed signals from the reader;
  b. means for delaying the signal from said squaring means and for gating the delayed and undelayed signals from said squaring means to obtain, upon the non-concurrent receipt of either, a digital signal;
  c. means initiated by the clock component of the digital signal from said digitizing means for producing a signal whose period is compensated by the speed of the digital signal to be proportional to a predetermined time frame in which probabilistically the data component of the digital signal may occur wherein said signal rate compensation means includes an adjustment circuit means for adjusting the period of the compensated signal over a plurality of time intervals between clock pulses; and
  d. gating means responsive to the concurrent receipt of signals from said speed compensation means and said digitizing means for producing a signal indicative that the digital signal from said digitizing means is a data component, and wherein said speed compensation means further includes input circuit means comprising:
    (a) inverting means for reversing the polarity of the digital signal received from said digitizing means; and
    (b) resistive-capacitive circuit means for shaping the inverted digital signal to a spike operative to trigger said speed compensation means.

15. The amplifier system of claim 14 wherein said input circuit means further includes a grounded diode means for clamping any positive overshoot of the spike of said resistive-capacitive circuit means as it discharges to ground.

16. The amplifier system of claim 14 wherein said speed compensation means further includes a monostable multivibrator means triggered by the spike of said input circuit means to output a signal related to the signal outputted by said speed compensation means.

17. The amplifier system of claim 16 wherein said monostable multivibrator means is an operational amplifier with resistive-capacitive feedback.

18. The amplifier system of claim 16 wherein said monostable multivibrator means further comprises resistive-capacitive circuit means for providing feedback for setting the period of said monostable multivibrator means.

19. The amplifier system of claim 18 wherein said speed compensation means further included adjustment circuit means responsive to the signal outputted by said monostable multivibrator means for acting to variably bias said resistive-capacitive circuit means of said monostable multivibrator means according to the signal speed of the clock components of the digital signal from said digitizing means for adjustably maintaining the period of the outputted signal of said monostable multivibrator means at a fixed ratio of the period of the clock components.

20. The amplifier system of claim 19 wherein the period of the outputted signal of the monostable multivibrator means is two thirds that of the clock component period of the digital signal.

21. The amplifier system of claim 20 wherein said adjustment circuit means further comprises:
  a. means responsive to an outputted signal from the monostable multivibrator means to produce a driving signal; and
  b. capacitive means operatively connected to said driver means and said resistive-capacitive circuit means of said monostable multivibrator means for storing a potential proportional to the period that said driver means discharges said capacitive means which will in turn set the next relative charging level of said resistive-capacitive circuit means and thus the period of the output signal of said monostable multivibrator means.

22. The amplifier system of claim 21 wherein said driver means is a transistor.

23. The amplifier system of claim 21 wherein said capacitive means is a grounded capacitor.

24. The amplifier system of claim 21 wherein said adjustment circuit means further comprises:
  a. biased resistive-capacitive means operative to be reset by the outputted signal from said monostable multivibrator means for receiving a charge between resets; and
  b. diode means operative to be forward biased after said biased resistive-capacitive means have charged without reset for a period analogously equivalent to a given plurality of signals from said monostable multivibrator means for switching on said driver means to dischargably bias said capacitive means to a level sufficient to ensure that after a quiescent state the period of the outputted signal of said monostable multivibrator means will be less than the clock component period of the digital signal.

25. The amplifier system of claim 24 wherein said adjustment circuit means further comprises biased diode means grounded at one end and operative at its other end with said capacitive means, and said resistive-capacitive circuit means of said monostable multivibrator means for providing a charging potential clamp for said capacitive means when it is relatively positive and when said driver means has entered a quiescent state for disallowing astable operation by said monostable multivibrator means in response to said capacitive means approaching ground before said biased resistive-capacitive means can time-out to discharge said capacitive means.

26. The amplifier system of claim 25 wherein said biased diode means is comprised of a plurality of serially connected diodes that are interposably biased.

27. A data identifying apparatus responsive to signals that have been obtained from a digitizer and for distinguishing data pulses from clock pulses in the digitized signal through a relatively wide spectrum of signal rates, comprising:
 a. signal rate compensation means triggered by the clock pulse for creating a compensated signal whose period may be adjusted by the clock pulse rate to be proportional to a predetermined time frame in which it is probable that data pulses may occur wherein said signal rate compensation means includes an adjustment circuit means for adjusting the period of the compensated signal over a plurality of time intervals between clock pulses; and
 b. gating means operative to receive signals from said signal rate compensation means and said digitizer for outputting upon the concurrent receipt thereof a pulse signifying that the digitized signal is data.

28. The data identifying apparatus of claim 27 wherein said signal rate compensation means is a monostable multivibrator means with resistive-capacitive feedback means for generating the period of the compensated signal as a function of the clock pulse rate acting on said resistive-capacitive feedback means.

29. The data identifying apparatus of claim 28 wherein said adjustment circuit means includes:
 a. means responsive to the compensated signal from said monostable multivibrator means for producing a driving signal; and
 b. capacitive means operatively connected to said driver means and said resistive-capacitive feedback means for storing a potential that is proportional to the period that said driver means is switched on, and for utilizing the potential level of said capacitive means to set the relative bias level of said resistive-capacitive feedback means to adjust the period of said monostable multivibrator means in accordance with the predetermined time frame if the signal rate should change.

30. The data identifying apparatus of claim 29 further comprising:
 a. biased resistive-capacitive means operative to be reset by the compensated signals from said monostable multivibrator means for receiving a charge between resets; and
 b. diode means operative to be forward biased after said biased resistive-capacitive means have charged without reset for a period analogously equivalent to a given plurality of compensated signals from said monostable multivibrator means for switching on said driver means to dischargably bias said capacitive means to a level sufficient to ensure that after a quiescent state the period of the compensated signal will be less than the clock pulse period.

31. The data identifying apparatus of claim 30 further comprises biased diode means grounded at one end and operative at its other end with said capacitive means and said resistive-capacitive feedback means for providing a charging potential clamp for said capacitive means when it is relatively positive and when said driver means has entered a quiescent state for disallowing astable operation by said monostable multivibrator means in response to said capacitive means approaching ground before said biased resistive-capacitive means can time-out to discharge said capacitive means.

32. A data amplifying device operatively responsive to digitized signals from an encoded card reader for detecting data pulses from clock pulses in the digitized signal even as the digitized signal rate changes, comprising:
 a. monostable multivibrator means operative to be triggered by the clock pulses in the digitized signal for producing a signal having a given period;
 b. resistive-capacitive feedback means responsive to the rate of the clock pulses of the digitized signal for providing feedback for setting the period of said monostable multivibrator means;
 c. gating means responsive to the digitized signal and the signal of said monostable multivibrator means for outputting a signal upon the concurrent receipt thereof that is indicative that the received digitized signal is a data pulse; and
 d. adjustment circuit means for adjusting the period of the compensated signal over a plurality of time intervals between clock pulses, said resistive capacitive feedback means being responsive to the adjustment circuit means.

33. The data amplifying device of claim 32 further comprising:
 a. means responsive to the signal from said monostable multivibrator means for producing a driving signal; and
 b. capacitive means operatively connected to said driver means and said resistive-capacitive feedback means for storing a potential that is proportional to the period that said driver means is switched on, and for utilizing the potential level of said capacitive means to set the relative bias level of said resistive-capacitive feedback means to adjust the period of said monostable multivibrator means in accordance with the predetermined time frame if the digitized signal rate should change.

34. The data amplifying device of claim 33 further comprising:
 a. biased resistive-capacitive means operative to be reset by the signals from said monostable multivibrator means for receiving a charge between resets; and
 b. diode means operative to be forward biased after said biased resistive-capacitive means have charged without reset for a period analogously equivalent to a given plurality of signals from said monostable multivibrator means for switching on said driver means to dischargably bias said capacitive means to a level sufficient to ensure that after a quiescent state the period of the signal from said monostable multivibrator means will be less than the clock pulse period.

35. The data amplifying device of claim 34 further comprises biased diode means grounded at one end and operative at its other end with said capacitive means and said resistive-capacitive feedback means for providing a charging potential clamp for said capacitive means when it is relatively positive and when said driver means has entered a quiescent state for disallowing astable operation by said monostable multivibrator means in response to said capacitive means approaching ground before said biased resistive-capacitive means.

36. A method for distinguishing a data component from a clock component of a digitized signal read from an encoded card over a wide spectrum of digitized signal rates, said method comprising the steps of:
 a. producing a signal upon being initiated by the clock component, whose period may be adjusted over a plurality of time intervals between clock pulses to be proportional to a predetermined time frame in which it is probable that data components may occur; and b. gating the digitized signal with the adjusted signal to obtain, upon the concurrent receipt thereof, a signal indicating that the digitized signal is a data component.

37. A method of differentiably obtaining data and clock components from a signal read from an encoded card over a wide range of signal rates, said method comprising the steps of:
 a. delaying the read signal;
 b. producing a square wave signal whose transitions correspond to the intersections of the delayed and undelayed read signals;
 c. delaying the square wave signal;
 d. exclusive OR gating the delayed and undelayed square wave signals to obtain a digitized signal upon the non-concurrent receipt thereof;
 e. creating a signal, upon being initiated by the clock component of the digitized signal, whose period may be adjusted over a plurality of time intervals between clock pulses to be proportional to a predetermined time frame in which it is probable that data components may occur; and
 f. AND gating the digitized signal with the adjusted signal to obtain, upon the concurrent receipt thereof, a signal indicating that the digitized signal is a data component.

* * * * *

UNITED STATES PATENT OFFICE
CERTIFICATE OF CORRECTION

Patent No. 4,088,879    Dated May 9, 1978

Inventor(s) Eugene F. Banka & Roger F. Thompson

It is certified that error appears in the above-identified patent and that said Letters Patent are hereby corrected as shown below:

Col. 15, Line 11, delete "time intervals between clock pulses" and insert --clock periods--.
Col. 16, Line 14, after "plurality of" delete "time" and insert --clock--.
Col. 16, Line 15, delete "intervals between clock pulses" and insert --periods--.
Col. 16, Line 65, delete "time intervals between clock"
Col. 16, Line 66, delete "pulses" and insert --clock periods--.
Col. 17, Line 5, after "method" delete "of" and insert --for--.
Col. 18, Line 6, delete "time intervals" and insert --clock periods--.
Col. 18, Line 7, delete "between clock pulses"

Signed and Sealed this

*Twelfth* Day of *December 1978*

[SEAL]

Attest:

RUTH C. MASON
*Attesting Officer*

DONALD W. BANNER
*Commissioner of Patents and Trademarks*